United States Patent
Brok et al.

(10) Patent No.: US 11,584,234 B2
(45) Date of Patent: Feb. 21, 2023

(54) METHOD AND DEVICE FOR DETERMINING WHEEL SLIP INFORMATION OF AN ELECTRICALLY DRIVEN WHEEL OF A MOTOR VEHICLE

(71) Applicant: AUDI AG, Ingolstadt (DE)

(72) Inventors: Tobias Brok, Koesching (DE); Herbert Ernst, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 273 days.

(21) Appl. No.: 16/633,704

(22) PCT Filed: Aug. 28, 2018

(86) PCT No.: PCT/EP2018/073139
§ 371 (c)(1),
(2) Date: Jan. 24, 2020

(87) PCT Pub. No.: WO2019/052807
PCT Pub. Date: Mar. 21, 2019

(65) Prior Publication Data
US 2020/0198471 A1    Jun. 25, 2020

(30) Foreign Application Priority Data
Sep. 12, 2017   (DE) .................. 10 2017 216 020.9

(51) Int. Cl.
*B60L 3/10* (2006.01)
*B60T 8/175* (2006.01)

(52) U.S. Cl.
CPC .............. *B60L 3/104* (2013.01); *B60L 3/102* (2013.01); *B60T 8/175* (2013.01);
(Continued)

(58) Field of Classification Search
CPC .... B60L 3/104; B60L 3/102; B60L 2240/421; B60L 2240/427; B60L 2240/429; B60L 2240/461; B60T 8/175
See application file for complete search history.

(56) References Cited

U.S. PATENT DOCUMENTS

| 5,574,643 A * | 11/1996 | Yesel | B60W 10/12 701/88 |
| 2009/0101428 A1* | 4/2009 | Itoh | B60T 8/175 180/197 |

(Continued)

FOREIGN PATENT DOCUMENTS

| CN | 102501779 A | 6/2012 |
| CN | 105751919 A | 7/2016 |

(Continued)

OTHER PUBLICATIONS

Translated and annotated Wimmer (DE 102010018705) (Year: 2011).*

(Continued)

*Primary Examiner* — James M McPherson
*Assistant Examiner* — Kyle J Kingsland
(74) *Attorney, Agent, or Firm* — Maier & Maier, PLLC

(57) ABSTRACT

A method and a device for determining wheel slip information of an electrically driven wheel of a motor vehicle, according to which during travel, the speed (nE-motor) of an electric motor driving the wheel is detected and the detected speed (nE-motor) of the electric motor is used to determine the wheel slip information.

7 Claims, 1 Drawing Sheet

(52) U.S. Cl.
CPC ... *B60L 2240/421* (2013.01); *B60L 2240/427* (2013.01); *B60L 2240/429* (2013.01); *B60L 2240/461* (2013.01)

(56) References Cited

U.S. PATENT DOCUMENTS

| | | | |
|---|---|---|---|
| 2010/0191434 A1* | 7/2010 | Fujita | B60W 10/11 701/91 |
| 2013/0073162 A1* | 3/2013 | Kim | G01P 3/46 903/902 |
| 2014/0343772 A1 | 11/2014 | Loos et al. | |
| 2017/0247035 A1 | 8/2017 | Ienaga | |
| 2019/0039460 A1* | 2/2019 | Teramoto | H02P 27/08 |

FOREIGN PATENT DOCUMENTS

| | | |
|---|---|---|
| DE | 4017891 C1 | 9/1991 |
| DE | 4402699 C2 | 1/1996 |
| DE | 102008011791 A1 | 9/2009 |
| DE | 102010003076 A1 | 8/2011 |
| DE | 102010018705 A1 | 11/2011 |
| DE | 102011110012 A1 | 3/2012 |
| DE | 102010062646 A1 | 6/2012 |
| DE | 102011088107 A1 | 3/2013 |
| EP | 1018451 A1 | 7/2000 |
| EP | 2612798 A1 | 7/2013 |
| EP | 2540544 B1 | 2/2014 |
| EP | 3020598 A1 | 5/2016 |
| WO | 2015093381 A1 | 6/2015 |

OTHER PUBLICATIONS

Translated and annotated Raiser (DE 4017891) (Year: 1990).*
German Examination Report dated Apr. 20, 2018 in corresponding German Application No. 10 2017 216 020.9; 24 pages; Machine translation attached.
International Search Report dated Dec. 3, 2018 and Written Opinion in corresponding International Application No. PCT/EP2018/073139; 20 pages; Machine translation attached.
International Preliminary Report on Patentability (Chapter I) dated Mar. 26, 2020, in corresponding International application No. PCT/EP2018/073139; 12 pages.
Office Action dated Aug. 24, 2022, in connection with corresponding Chinese Patent Application No. 201880053185.9 (17 pp., including machine-generated English translation).

* cited by examiner

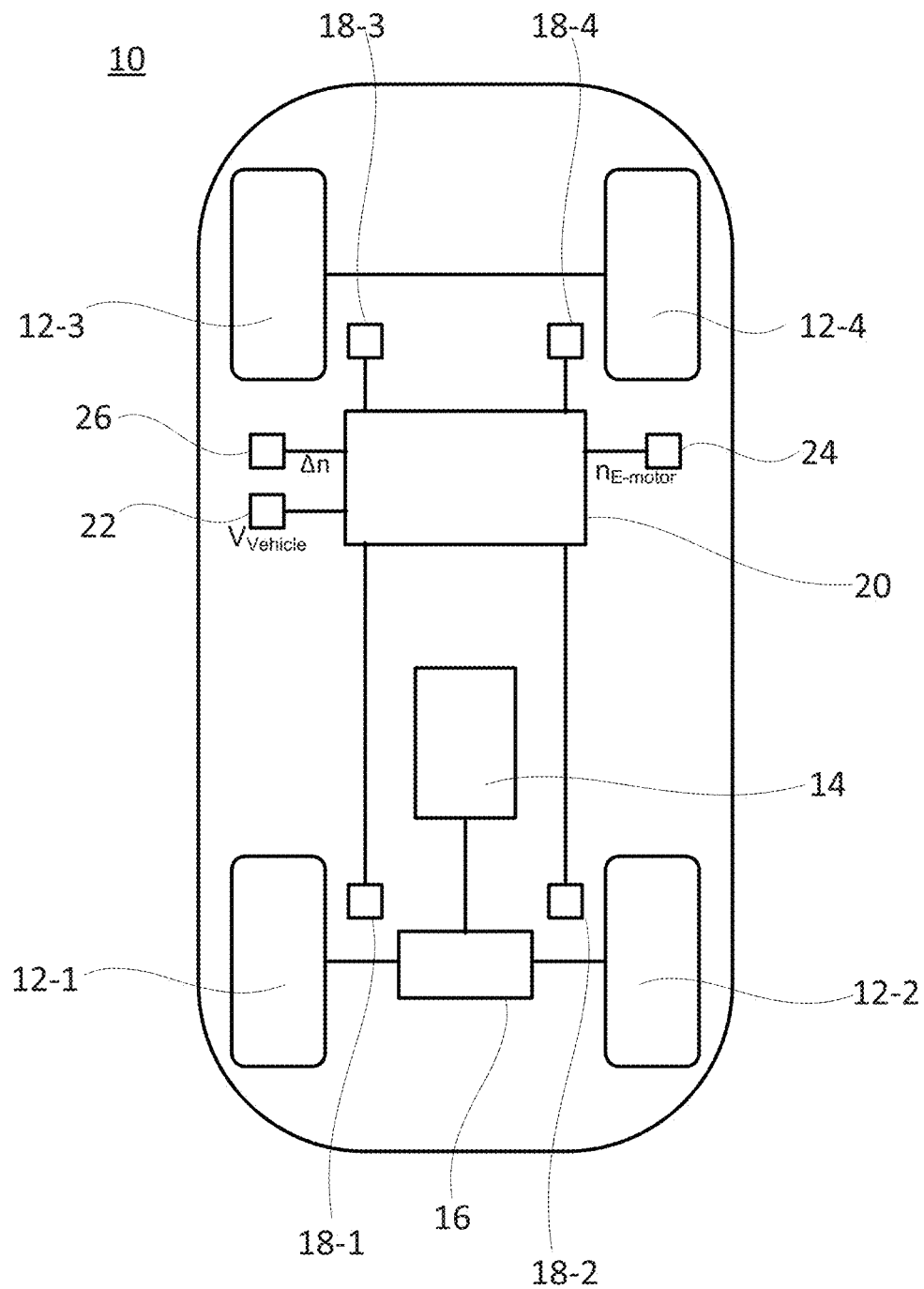

METHOD AND DEVICE FOR DETERMINING WHEEL SLIP INFORMATION OF AN ELECTRICALLY DRIVEN WHEEL OF A MOTOR VEHICLE

FIELD

The disclosure relates to a method for determining wheel slip information of an electrically driven wheel of a motor vehicle, in particular after a failure of a wheel speed sensor assigned to said wheel and to a device for carrying out the method.

BACKGROUND

To ensure vehicle stability or steerability of a motor vehicle even on slippery surfaces, information regarding the slip on the wheel is necessary. Today's ABS/ESC systems use wheel speed information to ascertain which wheel is slipping and by how much.

Currently, if one or more wheel speed sensors fail, this is indicated to the driver (warning by ABS/ESC light) and the driver is responsible for safely driving or parking the vehicle. In terms of the functioning of piloted or (partially) autonomous driving in particular, this would have the consequence that the piloted or (partially) autonomous driving function would have to be deactivated for a short time, because the lack of information about the wheel slip could place the vehicle in a safety-critical driving situation that can no longer be mastered by the system.

SUMMARY

The object of the invention is to specify a method by which, in the event of failure of a wheel speed sensor, backup information about the liability situation (slip) of the wheels of the motor vehicle can be generated.

According to the method for determining wheel slip information of an electrically driven wheel of a motor vehicle, the speed of the electric motor detected while the motor vehicle is traveling is used to determine the wheel speed.

The method according to the invention now advantageously ensures that backup slip information can be generated even in the event of failure of a wheel speed sensor. In other words, redundant wheel slip information is made available by the method according to the invention. This has the positive effect that, since backup slip information is now available, deactivation is not absolutely necessary in the case of piloted or (partially) autonomous driving.

According to a first embodiment, an electric motor is assigned to each wheel of the motor vehicle, i.e., each wheel of the motor vehicle is driven by a separate electric motor. In this case, the method according to the invention provides that, to determine or generate the backup wheel slip information from the speed, detected during travel, of the electric motor $n_{E\text{-}motor}$ and from the gear ratio $i_G$, assuming gearing is arranged between the output shaft of the electric motor and the drive shaft of the wheel, a theoretical wheel speed $n_{wheel,theo}$ of the wheel is determined according to the formula $$n_{wheel,theo} = \frac{n_{E\text{-}Motor}}{i_G}$$

is determined. If no gearing is arranged between the output shaft of the electric motor and the drive shaft of the wheel, $i_G=1$ should be used in the above equation. The current vehicle speed $V_{vehicle}$ of the motor vehicle, likewise detected while the motor vehicle is traveling, is then used to determine a theoretical actual wheel speed $n_{wheel,actual}$ of the wheel according to the formula $$n_{wheel,actual} = \frac{V_{vehicle}}{\pi d_{wheel}} \text{ wherein } d_{wheel} = \text{diameter of the wheel}$$

In a final step, a comparison comparing the determined theoretical wheel speed $n_{wheel,theo}$ with the determined actual wheel speed $n_{wheel,actual}$ is performed in a regulating/control unit. If the comparison shows that the determined theoretical wheel speed $n_{wheel,theo}$ deviates significantly from the determined actual wheel speed $n_{wheel,actual}$, it is determined as wheel slip information that the wheel in question is slipping.

According to a second embodiment, the wheels of an axle are driven by a common electric motor and an axle differential is arranged between the wheels of the axle. The gear ratio of the axle differential is referred to in the following as $i_A$. Optionally, gearing having the gear ratio $i_G$ may also be arranged between the output shaft of the electric motor and the input shaft to the axle differential (assuming no gearing=>$i_G$=1). In this case, the method provides that, to determine or generate the backup wheel slip information, in addition to detecting the speed of the electric motor $n_{E\text{-}motor}$ while the motor vehicle is traveling, a speed difference $\Delta n$ between the wheels of the axle caused by the axle differential is also detected, and that the detected speed $n_{E\text{-}motor}$ of the electric motor, the detected speed difference $\Delta n$, the axle differential ratio $i_A$, and, if gearing is provided, the gear ratio $i_G$ for both wheels of the axle are used to determine a theoretical wheel speed $n_{wheel,theo}$ according to the formula $$n_{wheel,theo} = \frac{1}{2}\left(\frac{n_{E\text{-}Motor}}{i_G i_A} \pm \Delta n\right)$$

In a subsequent step, the theoretical actual wheel speeds of the wheels $n_{wheel,actual}$ of the axle are determined from the current vehicle speed $V_{vehicle}$ detected while the motor vehicle is traveling. This is accomplished using the formula:

$$n_{wheel,actual} = \frac{V_{vehicle}}{\pi d_{wheel}} \text{ wherein } d_{wheel} = \text{diameter of the wheel}$$

A comparison comparing the determined theoretical wheel speed $n_{wheel,theo}$ of the wheels of the axle with the determined theoretical actual wheel speed $n_{wheel,actual}$ is then performed in a regulating/control unit. If the comparison shows that the determined theoretical wheel speed $n_{wheel,theo}$ of one or both wheels deviates significantly from the determined actual wheel speed $n_{wheel,actual}$, the determined wheel slip information is that the wheel in question or both wheels of the axle are slipping.

The speed difference $\Delta n$ between the wheels of an axle can be detected in a variety of ways, e.g., by a separate sensor provided specifically for this purpose. Alternatively, the speed difference $\Delta n$ may also be calculated based on other, additional backup information that is available, e.g. such that, since the wheel speed sensors of the wheels of an axle typically do not fail at the same time and therefore reference information on the axle is available, the speed difference Δn is determined from the speed of the input shaft to the axle differential and the backup information from the wheel speed sensor that is still operating.

In the two described embodiments, the determined theoretical wheel speeds of the wheels of an axle are preferably also compared with one another. If the comparison for the wheels of an axle shows, for example, that $n_{wheel,left,theo} > n_{wheel,right,theo}$, in the case of acceleration or travel at a constant speed this is an indication that the left wheel is slipping and must be braked, or in the case of deceleration, i.e., active braking or motor thrust/recuperation, this is an indication that the right wheel is blocked and pressure must be released from the brake or the motor thrust/the recuperation must be halted.

The speed of the electric motor is preferably determined from the current profile and/or the voltage drop and/or from information about control of the motor. An alternative embodiment provides for determination of the speed of the electric motor via a sensor, e.g., in the form of a Hall sensor.

According to a further advantageous embodiment of the method according to the invention, a significant deviation of the determined theoretical wheel speed $n_{wheel,theo}$ from the determined actual wheel speed $n_{wheel,actual}$ is present if the following applies to the wheel speeds:

$$n_{wheel,actual} \leq 0.9 n_{wheel,theo} \text{ or } n_{wheel,actual} \geq 1.1 n_{wheel,theo}$$

The object of the invention is further to specify a device for carrying out the method for determining wheel slip information of an electrically driven wheel of a motor vehicle.

The device according to the invention for determining wheel slip information of an electrically driven wheel of a motor vehicle comprises an electric motor for driving the wheel, a wheel speed sensor assigned to the wheel, and means for detecting the speed of the electric motor. The device further comprises a regulating/control unit, to which the current motor vehicle speed and the output signals of the wheel speed sensor assigned to the wheel are provided as input signals. According to the invention, the data collected about the speed of the electric motor are also provided as a further input variable to the regulating/control unit.

The provision of the information about the speed of the electric motor as a further input variable to the regulating/control unit now advantageously enables the determination of redundant wheel slip information.

The means for detecting the speed of the electric motor are preferably configured to generate the speed of the electric motor from the current profile and/or the voltage drop and/or from information about control of the motor.

An alternative embodiment provides that the means for detecting the speed of the electric motor are configured in the form of a separate sensor.

BRIEF DESCRIPTION OF THE DRAWING

Further advantages and possible uses of the present invention will be apparent from the following description in conjunction with the exemplary embodiment depicted in the drawing.

In the drawing:

FIG. 1 is a schematic representation of a motor vehicle designed to illustrate the method for determining redundant wheel slip information of an electrically driven wheel of a motor vehicle.

DETAILED DESCRIPTION

FIG. 1 shows a schematic representation of a motor vehicle designated as a whole by reference number 10. In the present case, the rear wheels 12-1 and 12-2 are driven by an electric motor 14, and the wheels 12-3 and 12-4 of the front axle are not driven. Between the wheels 12-1, 12-2 of the rear axle, an axle differential designated by reference number 16 is arranged in a known manner. In addition, each wheel 12-1, 12-2, 12-3, 12-4 of the motor vehicle 10 is assigned a wheel speed sensor 18-1, 18-2, 18-3, and 18-4, in order to determine which wheel is slipping and by how much. The system is controlled based on this information, i.e., the wheel that is slipping is typically braked.

If, e.g., wheel speed sensor 18-1 should fail, slip control of the wheel 12-1 would no longer be possible. As a consequence, particularly with respect to future functions such as piloted or (partially) autonomous driving, for example, such functions would have to be deactivated at least for a short time, because the failure of the wheel speed sensor 18-1 on wheel 12-1 would mean that slip control is no longer possible, and thus the motor vehicle 10 might be placed in a safety-critical driving situation.

This is exactly where the invention comes in: As shown in FIG. 1, a regulating/control unit 20 is provided, to which the output signals of the wheel speed sensors 18-1, 18-2, 18-3, and 18-4 are provided as input variables, along with the current vehicle speed $V_{vehicle}$ (cf., reference number 22), the speed $n_{E-motor}$ of the electric motor 20 (cf., reference number 24), and the speed difference Δn between the wheels 12-1, 12-2 of the rear axle (cf., reference number 26) caused by the axle differential 16, as indicated schematically.

For the following explanation of the method, it is assumed that the wheel speed sensor 18-1 assigned to the left rear wheel 12-1 has failed.

In a first method step, the regulating/control unit 14 then calculates the theoretical wheel speed $n_{wheel,left,theo}$ of the left rear wheel 12-1 that is induced by the power output from the electric motor 16:

$$n_{wheel,left,theo} = \frac{1}{2}\left(\frac{n_{E\text{-}motor}}{i_G i_A} \pm \Delta n\right)$$

wherein in the present case, since no gearing is arranged between the electric motor 16 and the axle differential, $i_G = 1$ and the value of the axle differential ratio $i_A$ is stored in the control unit.

The invention claimed is:

1. A method for determining wheel slip information of an electrically driven wheel comprising:

a motor vehicle, according to which during travel, when a wheel speed sensor for the electrically driven wheel fails, a speed ($n_{E\text{-}motor}$) of an electric motor driving the wheel is calculated from a current profile and/or a voltage drop and/or from information about control of the motor, and the calculated speed ($n_{E\text{-}motor}$) of the electric motor is used to determine the wheel slip information, wherein the wheels of an axle are driven via a common electric motor and an axle differential, and a speed difference (Δn) between the wheels of the axle caused by the axle differential is detected, wherein a theoretical wheel speed ($n_{wheel,theo}$) is determined from the calculated speed ($n_{E\text{-}motor}$) of the electric motor, the speed difference (Δn), and a gear ratio and axle differential ratio ($i_G$, $i_A$) for both wheels of the axle, and in that an actual wheel speed ($n_{wheel,actual}$) of the wheels of the axle is determined from a current driving speed ($V_{vehicle}$) of the motor vehicle, wherein when the theoretical wheel speed ($n_{wheel,theo}$) of one or more wheels deviates from the actual wheel speed ($n_{wheel,actual}$), it is determined as wheel slip information that the wheel in question or both wheels of the axle is/are slipping.

2. The method according to claim 1, wherein each electrically driven wheel is assigned a separate electric motor.

3. The method according to claim 2, wherein the theoretical wheel speed ($n_{wheel,theo}$) of the wheel is calculated according to the formula $$n_{wheel,theo} = \frac{n_{E\text{-}Motor}}{i_G}$$

and the actual wheel speed ($n_{wheel,actual}$) of the wheel is calculated according to the formula $$n_{wheel,left,actual} = \frac{V_{vehicle}}{\pi d_{wheel}}$$

wherein $d_{wheel}$=diameter of the wheel.

4. The method according to claim 1, wherein the theoretical wheel speed ($n_{wheel,theo}$) of the wheels of the axle is calculated according to the formula $$n_{wheel,theo} = \frac{1}{2}\left(\frac{n_{E\text{-}motor}}{i_G i_A} \pm \Delta n\right)$$

and the actual wheel speed ($n_{wheel,actual}$) of the wheels of the axle is calculated according to the formula $$n_{wheel,actual} = \frac{V_{vehicle}}{\pi d_{wheel}}, \text{ wherein } d_{wheel} = \text{diameter of the wheel.}$$

5. The method according to claim 1, wherein the actual wheel speed ($n_{wheel,actual}$) deviates from the theoretical wheel speed when the following applies to the wheel speeds:

$$n_{wheel,actual} \leq 0.9 \; n_{wheel,theo} \quad \text{or} \quad n_{wheel,actual} \geq 1.1 \; n_{wheel,theo.}$$

6. The method according to claim 2, wherein the actual wheel speed ($n_{wheel,actual}$) deviates from the theoretical wheel speed when the following applies to the wheel speeds:

$$n_{wheel,actual} \leq 0.9 \; n_{wheel,theo} \quad \text{or} \quad n_{wheel,actual} \geq 1.1 \; n_{wheel,theo.}$$

7. A device for determining wheel slip information of an electrically driven wheel of a motor vehicle when a wheel speed sensor for the electrically driven wheel fails, comprising:

an electric motor for driving the wheel, the wheel speed sensor assigned to the wheel, and a regulating/control unit configured for calculating a speed ($n_{E\text{-}motor}$) of the electric motor, wherein the current motor vehicle speed ($V_{vehicle}$), the output signals of the wheel speed sensor, the speed ($n_{E\text{-}motor}$) of the electric motor, and at least one of a voltage, current, or control signal for the electric motor, are provided as input signals to the regulating/control unit, wherein the regulating/control unit is configured to determine wheel slip information using the input signals when the wheel speed sensor fails, wherein one or more wheels of an axle are driven via a common electric motor and an axle differential, and a speed difference ($\Delta n$) between the wheels of the axle caused by the axle differential is detected, wherein a theoretical wheel speed ($n_{wheel,theo}$) is determined from the calculated speed ($n_{E\text{-}motor}$) of the electric motor, the speed difference ($\Delta n$), and a gear ratio and axle differential ratio ($i_G$, $i_A$) for both wheels of the axle, and in that an actual wheel speed ($n_{wheel,actual}$) of the wheels of the axle is determined from a current driving speed ($V_{vehicle}$) of the motor vehicle, wherein when the theoretical wheel speed ($n_{wheel,theo}$) of one or both wheels deviates from the actual wheel speed ($n_{wheel,actual}$), it is determined as wheel slip information that the wheel in question or both wheels of the axle is/are slipping.

\* \* \* \* \*